Aug. 2, 1932.  L. W. BUGBEE, JR  1,869,461
MULTIFOCAL LENS
Filed March 23, 1927
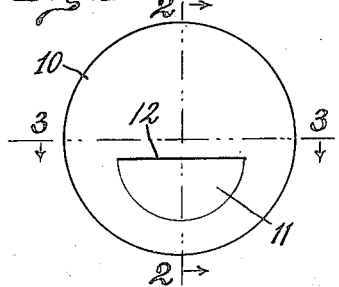
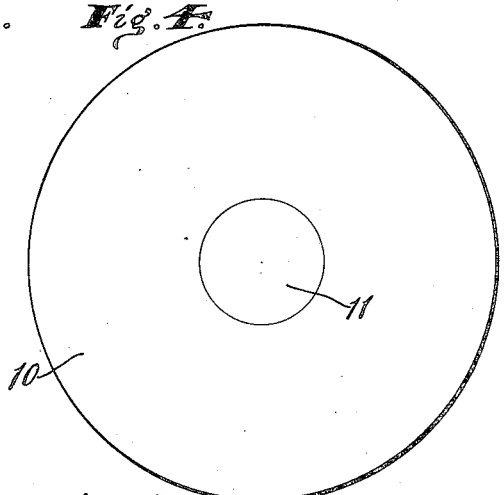
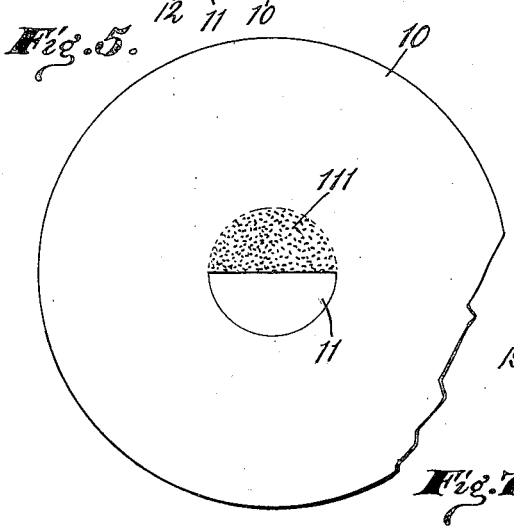
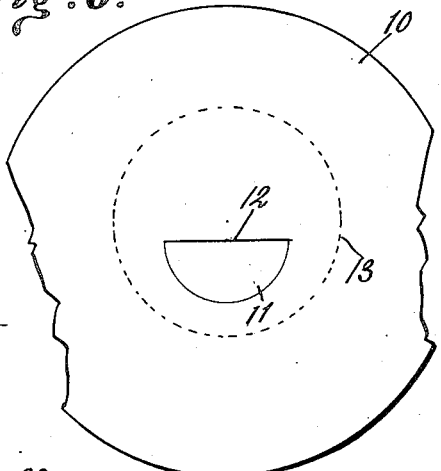
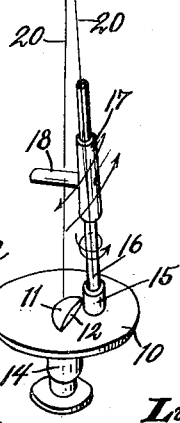
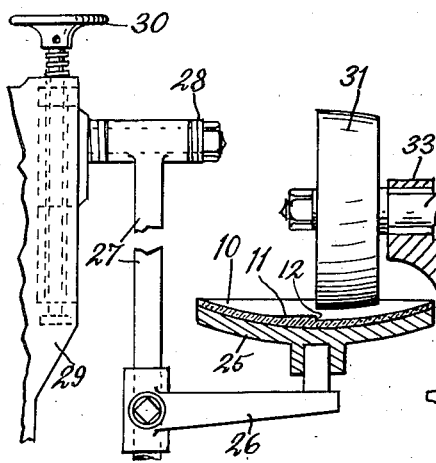
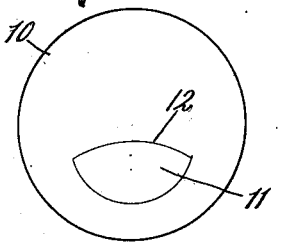
Inventor.
Lucian W. Bugbee Jr.
by
Lockwood, Lockwood, Goldsmith & Galt,
His Attorneys Patented Aug. 2, 1932

1,869,461

UNITED STATES PATENT OFFICE

LUCIAN W. BUGBEE, JR., OF INDIANAPOLIS, INDIANA, ASSIGNOR, BY MESNE ASSIGNMENTS, TO CONTINENTAL OPTICAL MANUFACTURING COMPANY, OF INDIANAPOLIS, INDIANA, A CORPORATION

MULTIFOCAL LENS

Application filed March 23, 1927. Serial No. 177,629. REISSUED

My invention relates to an improved multifocal opthalmic lens, the lens being of the class of lenses known as "no jump" multifocal lenses, wherein the image seen does not abruptly change its position as the eye passes across a certain point in the boundary between two of its visual portions.

One of the principal objects of my invention is to provide a lens of the above type which has a reading or near portion with a boundary line approximately semicircular in shape; and preferably with the substantially straight portion of said boundary line uppermost and the curved part of the boundary line being below.

Another leading object of the invention is to eliminate the image jump across a point from the near portion so that the wearer thereof will not be confused by the double image, or partially blurred image, present when the wearer looks through the dividing line of multifocal lenses of the ordinary type.

Another object of my invention is to provide a lens of the above type free from the laterally located zones of prior lenses in the art, as said lateral zones interfere with sidewise vision, and at the same time minimizes the shoulders occurring in the "no jump" lenses of the prior art types.

The advantage of this new lens is that it provides an uninterrupted distance field in sidewise vision, due to the substantially straight or flat form of the upper portion of the boundary line of the near field, whereby the eye is able to move horizontally to and fro over the extreme width of the distance field without passing out of said field or being interfered with by the near field, as is the case in bifocal lenses having the ordinary arch-shaped near field.

With this construction of multifocal lens the maximum width of the near field is in the position most convenient for use, whereas in ordinary bifocal lenses a much larger near field must be used to obtain the same sidewise excursion of the eyes at a given depth below the dividing line.

Another advantage of this form of lens is that the lower portion of the near field tapers downwardly and merges into the surrounding distance field below, so that the wearer may look downwardly at the ground without the near field seriously interfering with his vision, said interference constituting a serious defect in the ordinary multifocal lens.

Other objects and features of this invention will be more fully understood from the accompanying drawing and the following description and claims.

In the drawing, Fig. 1 is a plan view of the preferred form of said lens. Fig. 2 is a vertical central section thereof on the line 2—2 of Fig. 1. Fig. 3 is a horizontal section thereof on the line 3—3 of Fig. 1. Fig. 4 is a one-piece saucer-shaped bifocal lens blank which is produced in the process of making said lens and the two concentric surfaces thereof have different curvatures. Fig. 5 shows the same lens blank as shown in Fig. 4 after substantially the upper half of the central reading portion of the lens blank has been ground away as hereafter explained, and part of the blank being broken away. Fig. 6 is the same as Fig. 5 after the ground away upper part of the reading portion of the blank has been polished, the outline of the lens afterwards to be cut therefrom being indicated by a dotted line and parts of the blank being broken away. Fig. 7 is a perspective view of a lens blank substantially as shown in Fig. 5, but on a smaller scale, and part of the means employed in grinding away the upper half of the reading portion of the blank, the radius of oscillation of the grinder being indicated diagrammatically. Fig. 8 is a view partly in elevation and partly in vertical section of parts of another means for grinding away the upper half of said reading portion of the lens blank, parts being broken away. Fig. 9 is a plan view of a slightly modified form of the lens shown in Fig. 1.

Prior to the present invention bifocal lenses were commercially made with an arch-shaped reading field occupying a large part of the lower portion of the lens. In many of such former lenses of this type there was no reading field below the distance field, although in many cases the reading field did surround the lower portion of the distance field but only with a slight width in that part of the lens.

Certain inventors have provided additional distance fields at the bottom of their lenses, but the arch-shaped form of the reading portion still remains. Consequently the wearer of such lenses must lower his eyes a considerable distance below the top of said dividing line in order to be able to have a considerable horizontal excursion of his eyes without passing outside of the reading portion. This lowering of the eyes is rendered all the more necessary by the prismatic effect ordinarily existing at the top of the reading portion, and this results in a split image when the upper part of the reading field is used.

In my invention this arch-shaped upper portion of the reading portion is eliminated and instead the reading portion is provided with a flat or substantially straight top horizontally. This permits the eyes to travel laterally in the reading field for a large distance to and fro without running out of the field, which is valuable for bookkeepers, surgeons, librarians and other persons doing work of a similar nature.

The fact that the reading field does not extend completely to the bottom of the lens and tapers downwardly and merges with the distance field below the reading field, enables the wearer to see the ground by looking through the distance field below the reading field and thus avoid stumbling or confusion of the ordinary bifocal lenses. He may also look through the dividing line across its flat top without being confused, since the image jump is eliminated at this point according to the principles obvious from the invention. In order to eliminate "image jump" at the point across the dividing line of the one-piece bifocal or multifocal lens, it is necessary that at said point the two adjacent surfaces have a common radial axis.

The preferred form of my new lens is shown in Figs. 1, 2 and 3, which show a solid one-piece bifocal lens having a major distance field 10 surrounding a semi-circular reading field 11 located in the lower part thereof. These fields have different curvatures so as to give to the two fields different focal powers, as is well understood in the art. The upper portion of the boundary line of the reading field, as seen in Fig. 1, is horizontally straight, or substantially so, although the invention is not limited to that exact form, as is shown in Fig. 9 where said line is slightly arched. The lower boundary line of the reading field is curved in the form of a reversed arch so as to taper downwardly as shown.

The reading field is entirely surrounded by the distance field so that there is a relatively wide portion of the distance field located below the reading field, for the purposes and with the advantages above enumerated.

The near field merges with the distance field along the curved boundary line thereof, but there is a horizontally extending shoulder 12 at the upper boundary of the near field, as seen in Figs. 2 and 3, although the ends of the straight upper boundary line merge into the distance field.

The character of the construction of said lens will be more fully understood from a consideration of the process of making the same.

A target lens blank, as shown in Fig. 4, is first formed with two concentric surfaces 10 and 11, of different curvatures. The curvature of the outer surrounding surface 10 is usually of six dioptrics, while the curvature of the near field 11 may be 4.50 dioptrics, so that from said blank and the two surfaces thereof the distance field and the near field of the finished blank can be formed.

The second step of the process consists in grinding away the upper half of the central reading portion 11, so as to make the curvature of the upper ground away half conform with the surrounding distance field curvature 10 and have the same curvature. The lower half of the original near portion 11 is not altered.

The third step in the process consists in polishing said ground-away surface 111 so as to leave the lens blank as shown in Fig. 6.

The fourth step in the process consists in cutting out of said lens blank shown in Fig. 6 the finished lens, as shown in Fig. 1. To do this said lens blank is cut along the dotted line 13, as shown in Fig. 6.

In Figs. 7 and 8 there is indicated means for grinding away the upper half of the central reading field of the blank to form the ground surface 111. Thus in Fig. 7 there is shown the lens blank as it appears in Fig. 5 mounted on a holder 14 and it need not be rotary in this step of the operation.

The surface 111 is ground by a button 15, preferably ring shaped, mounted on a spindle 16 that is carried by a sleeve 17 of a swinging arm 18 which is associated with parts, not shown, for causing the same and the spindle 16 and the grinding button to oscillate from the center 19. The radius line 20 should be the same in length as the radius of generation of the distance field 10, so that the surface 111 which is being ground will have exactly the same curvature as the distance field 10 and become a part thereof. The spindle and grinding button are also rotated as indicated by the arrows by means not shown, but which are familiar to those skilled in the art.

The polishing process can be carried out by any suitable means with which those skilled in the art are familiar.

In Fig. 8 which illustrates another means for grinding the surface 11, the lens blank is mounted on a lens holder 25 carried by a horizontal arm 26 that is secured to a swinging arm 27 mounted on the spindle 28 that is vertically adjustable in the frame 29 by means of the hand screw 30.

A grinding stone 31 carried by a shaft 32 mounted in an arm 33 of the framework and rotated or driven by means not shown will grind the surface 111 when the lens blank is fed upwardly to it; and the lens blank can be swung through an arm 27 upon the proper radius of curvature.

It is immaterial whether the grinder or lens holder be mounted so as to swing or be vertically adjustable. This will be understood by those skilled in the art. The above adjustability is desirable in order to take account of wear in the grinding stone or tool, for it should not do more than remove the desired part of the near field satisfactorily.

The polishing process may take place in any number of ways. In it one may employ cloth pad or pitch tool, reciprocating the same to and fro, the lens blank being immovably mounted. Preferably, however, disk polishing may take place by rotating the lens blank and employing a composition ring which is made to follow the contour of the surfaces and the outline of the reading portion of suitable cams, levers or gears well known to those skilled in the art.

In my lens the common radial axis of the two fields is the original axis on which the first blank in Fig. 4 is produced and being at the center of the blank and the reading portion 11.

By whatever means produced, the lens resulting will have the circular arcuate part of its dividing line substantially merged with the surface of the distance surface, and there will be a slight shoulder of variable height along the substantially horizontal portion of the boundary line which is adjacent to the part of the area removed in grinding. The upper boundary line of the near field is shown horizontally in Fig. 1, but the invention is not limited necessarily to that form as it can be slightly curved downward, as shown in Fig. 9, but in any event said portion of the boundary line is substantially horizontal as compared with the lower portion of the boundary line of the near field.

In my lens so produced I have provided a one-piece bifocal lens having a substantially semi-circular near field entirely surrounded by the distance field and with the jump of the image eliminated at its boundary line. This is because the near field merges with the distance field throughout the greater extent of its boundry line, that is, all of the circular portion thereof, and the substantially horizontal portion has a slight variable ridge or shoulder.

The lens also has an attractive and efficient design, is light in weight, and substantially free from color fringes and objectionable prismatic effects. It possesses no objectionable side areas and yet affords a distance vision from one side of and also below the near or reading field, and also provides the maximum width of the near field at its top where it is most used. These features are not present in other lenses heretofore developed.

By "semi-circular" herein I mean a field substantially of the forms shown in Figs. 1 and 9, and by the word "horizontal" I mean the upper portion of the boundary line of the near field, whether straight, as shown in Fig. 1, or curved slightly as shown in Fig. 9.

By "variable" with reference to the upper part of the boundary line of the near field, I mean variations substantially as shown in Fig. 3, wherein the shoulder 12 is higher at the middle point of the lens and grows gradually less until it merges with the distance field.

I claim as my invention:

1. A one piece multifocal lens having a near field with its boundary line partly circular and partly substantially horizontal, and a distance field surrounding said near field, with the near field merging with the distance field at the circular part of the boundary line thereof and being shouldered at substantially the horizontal portion of the boundary line thereof.

2. A one piece multifocal lens having a distance field and a near field entirely surrounded thereby and merging therewith except at the upper boundary line of the near field, said upper boundary line extending above the adjacent part of the distance field forming a shoulder, said shoulder varying in thickness.

In witness whereof, I have hereunto affixed my signature.

LUCIAN W. BUGBEE, Jr.